US007007305B2

(12) United States Patent
Carson et al.

(10) Patent No.: US 7,007,305 B2
(45) Date of Patent: Feb. 28, 2006

(54) REPEATER AMPLIFIER WITH SIGNAL FIREWALL PROTECTION FOR POWER LINE CARRIER COMMUNICATION NETWORKS

(75) Inventors: Steven R. Carson, Allen, TX (US); Raymond T. Griffin, Plano, TX (US)

(73) Assignee: Genlyte Thomas Group LLC, Louisville, KY (US)

( * ) Notice: Subject to any disclaimer, the term of this patent is extended or adjusted under 35 U.S.C. 154(b) by 695 days.

(21) Appl. No.: 09/947,964

(22) Filed: Sep. 6, 2001

(65) Prior Publication Data

US 2003/0043027 A1   Mar. 6, 2003

(51) Int. Cl.
*G06F 17/00* (2006.01)
(52) U.S. Cl. .................... 726/36; 375/211; 340/870.18
(58) Field of Classification Search ..............................
340/310.01–310.06, 870.18–870.27; 700/286, 700/292, 293, 295, 297, 298; 713/200–340; 375/130, 211; 726/1–36
See application file for complete search history.

(56) References Cited

U.S. PATENT DOCUMENTS

| | | | |
|---|---|---|---|
| 3,796,920 A | 3/1974 | Hedrick et al. ........... 317/28 R |
| 4,130,861 A | 12/1978 | LaForest ...................... 363/39 |
| 4,745,391 A | 5/1988 | Gajjar ......................... 340/310 |
| 4,903,006 A | 2/1990 | Boomgard ................. 340/310 |
| 5,257,006 A | 10/1993 | Graham et al. ............. 340/310 |
| 5,614,811 A | 3/1997 | Sagalovich et al. ......... 323/207 |
| 5,818,821 A | 10/1998 | Schurig ...................... 370/293 |
| 5,844,789 A | 12/1998 | Wynn .......................... 363/39 |
| 5,870,016 A | 2/1999 | Shrestha ................ 340/310.02 |

OTHER PUBLICATIONS

The Effects of Repeater Hard-Limiting, Filter Distortion, and Noise on a Pseudo-Noise, Time-Of-Arrival Estimation System Weinberg, A.; Communications, IEEE Transactions on [legacy, pre-1988] vol. 27, Issue 9, Sep. 1979 pp.:1271-1279.*

Design of the monoblock duplexer for the application of cellular band repeater; Duck-jae Lee; Gil-du Jang; Seong-ook Park; Young-seong Wang; Chung-kook Lee;Info-tech and Info-net, 2001. Proceedings. ICII 2001—Beijing. 2001 International Conferences on.*

Optical design and performance of wavelength-division-multiplexed optical repeater for fiber-optic passive star networks connection; Oguchi, K.; Hakamada, Y.; Minowa, J.; Lightwave Technology, Journal of vol. 4, Issue 6, Jun. 1986 pp.:665-671.*

* cited by examiner

*Primary Examiner*—David Jung
(74) *Attorney, Agent, or Firm*—Dennis T. Griggs

(57) ABSTRACT

A repeater amplifier boosts weak control signals on a PLC network, with noise discrimination and signal firewall protection. The AC supply voltage is filtered by a high frequency blocking filter to block external noise signals. Operating power for network signaling devices and the repeater amplifier is derived from the clean AC supply voltage. Noise discrimination and signal firewall protection are provided by amplifying and repeating only those receiver pulse signals that (a) have an analog amplitude that exceeds a predetermined analog threshold value, (b) occur during intervals that control data signal modulation is being applied to the filtered AC supply voltage and (c) occur at a frequency within a predetermined frequency band centered on the transmitted power line carrier (PLC) modulation frequency.

20 Claims, 5 Drawing Sheets

REPEATER AMPLIFIER WITH SIGNAL FIREWALL PROTECTION FOR POWER LINE CARRIER COMMUNICATION NETWORKS

BACKGROUND OF THE INVENTION

This invention relates generally to power line carrier (PLC) communication systems. In particular, the present invention provides a repeater amplifier circuit for boosting weak control signals on a PLC network, with noise discrimination and signal firewall protection.

Conventional power line carrier communication systems use existing alternating current (AC) power lines for conducting control signals between electronic devices attached to the power lines. Systems controlled in this manner include electronic appliances connected to electrical outlets, security alarm systems, garage door openers, lighting controls, dimmers and the like. In general, a pulse receiver is connected between the power line and each device that is to be controlled, and at least one pulse transmitter is connected to the power line. By utilizing the power line as the means for communication between the transmitters and receivers, such control systems can be installed without requiring the installation of additional wiring. Further, utilization of the power line also provides a greater physical range of control than may be available via infrared, ultrasonic or FM control systems.

Typically, the PLC communications are sent at a substantially higher carrier modulation frequency (i.e., frequencies at least two orders of magnitude higher than the power line frequencies), e.g. at 120 kHz to 200 kHz or higher as compared to conventional alternating current power distribution frequencies (e.g. 50/60 Hz or 200/400 Hz). There are substantial high frequency noise and interfering signals such as harmonics of the power signal, switching transients, etc. that interfere with the power line communications. Numerous techniques are known for operating in a noisy environment for example, in some cases, the communications messages are repeated to assure transmission, spread spectrum signals are used in other cases, in addition to many other techniques.

A major problem with power line carrier communications is spurious signals and background noise including impulse noise. Such noise can originate from the power source, the distribution network, loads coupled to the network and from remote sources. For example, the alternating current power delivered from a public utility is not a pure sine wave. The AC supply current contains harmonics that can interfere with power line communications. Additionally noise may be introduced from the loads (including switching transients). By way of illustration, if the load is a dimmer and lamp, the dimmer may "chop" the 60 Hz AC power waveform to reduce the lighting intensity. This introduces harmonics and high frequency noise on the power distribution conductors.

This makes it more difficult to communicate reliably over power lines particularly since some of the harmonics and noise associated with the power distribution fall within the frequency range of the communications signals. Such noise is not constant with respect to time, it also varies from place to place in the power distribution network. Moreover, a typical AC power line network is used for power distribution to several electrical load devices. Each of a variety of load devices can conduct a significant level of noise back onto the power line. Different loads and control devices produce different types and degrees of noise that may interfere with the flow of information over the power line.

Another problem potentially limiting a power line carrier communication system is signal attenuation. Due in part to the diverse impedance levels of the electric devices being used with a power line network, digital pulse communication signals may undergo more than 40 dB of attenuation before being captured by a receiver. This significant attenuation in combination with noise interference renders effective PLC communication very difficult.

The noise and attenuation problems existing in a particular power line network may vary substantially from one network to another depending upon on the types of devices attached to or coupled in some way to the power line network. Further, even the mode of operation of particular devices on the power line network may differentially affect the noise or attenuation levels throughout the network. For these reasons, a signaling protocol is preferred for efficiently and accurately transmitting information from a source node to a receiving node on a power line network.

One conventional signaling protocol "X-10" provides sensing, control and communications over power lines. The X-10 system was developed by Pico Electronics of Fife, Scotland and X-10 compatible products are distributed in the United States by X-10 (USA) Inc. of Northvale, N.J. The X-10 system utilizes a signaling means whereby simple control signals (i.e., on, off, dim, brighten, etc.) are transmitted over pre-existing power wires in the home for remotely controlling power to lights, appliances and the like. The X-10 power line data communication protocol is disclosed in U.S. Pat. Nos. 4,200,862; 4,628,440; and 4,638,299.

Another protocol for two-way communications links is the Electronic Industries Association Consumer Electronics Bus (CEBus) protocol for radio frequency media, power line carrier, infrared media and twisted pair media. The industry standard CEBUS (Consumer Electronics Bus) protocol (EIA IS-60) was adopted by the Electronics Industries Association (EIA). The CEBus protocol provides operating standards for establishing a local area network, or LAN, over five physical distribution media: a power line (PLBus), twisted pair (TPBus), coaxial cable (CXBus), infrared light (IRBus) and low power wireless radio (RFBus). This standard specifies how devices are to send and receive information, the media available to them for communication purposes and the format for the information the devices communicate to each other. In particular, the CEBus standard permits devices made by various manufacturers to be able to communicate with each other in a residential setting. The standard is documented in the CEBus EIA/IS-60 specification, which is fully incorporated herein by reference.

the X-10 system and as well as the CEBus and other encoded protocol systems the carrier detection threshold level is fixed. In selecting a threshold level for such a system, the level must be relatively high to provide some immunity from expected noise. The reliability of such systems is compromised when the signal-to-noise ratio is low. In particular, this increases system vulnerability to spurious signals and sensitivity to electrical noise, causing lost messages, false interpretation and spurious activation.

Different types of electrical noise that can interfere with PLC encoded protocol systems are developed on the AC power line from electronic devices such as: power tools and appliances that use induction motors, baby monitors and intercoms, electronic and magnetic ballasts, TVs, personal computers, battery charging systems and vacuum cleaners. The noise may have even originated from a neighbor who shares the same utility transformer. These types of noise disturbances can occur any time during the day, night or on a weekly basis, causing erratic communication including false turn-ON/OFF of PLC devices.

It is essential that the PLC signal strength be strong over the entire network. Low signal strength means erratic or loss of control on the most distant devices from a transmitting device, for example a remote dimmer control unit. Signal strength loss on a circuit can be due to several factors, including the number of interconnected PLC devices, power conductor losses and non-PLC devices on the circuit.

Typically, each device on the PLC network can reduce the signal strength progressively by as much as 15%–20% per device. For example: if a PLC device transmits a 4V signal strength on its power line then the next (2nd) nearest device on the same power line will load the signal strength down by 20% to 3.2V. The third device would reduce the remaining signal again by 20% to 2.6V, the fourth to 2.08V, the fifth to 1.664V, the sixth to 1.33V, the 7th to 1.065V, the 8th to 0.852V, the 9th to 0.68V, and the 10th device to 0.545V.

Power wiring losses must also be taken into account. Wiring loss is due to the power wiring resistance and capacitance losses that reduce signal strength. The greater the distance between a PLC device to another PLC device the more loss of signal strength occurs. The wiring has very little affect on signal strength if the PLC devices are in the same multi-ganged wall box or wiring distance is very short. However, for each 50 feet of 12 AWG Romex from one PLC device to another a loss of about 18% of the signal strength should be expected.

For example if a 150 ft. length of 12 AWG Romex is connected between two PLC devices and one device sends a 4.0 V signal strength command to the other unit, a signal strength of 1.77 V would be expected after losses: after the first 50 ft. of wire length, the signal strength would drop by 18% to 3.28 V, the next 50 ft. (100 ft. total) distance the signal strength would drop another 18% to 2.69 V, the last 50 ft. (150 ft. total) of distance signal strength would drop another 18% to 2.21 V. When the PLC receiving device loss of 20% included, the signal strength remaining would only be 1.12 V.

Other PLC devices or non-PLC devices on the PLC network that can degrade the signal strength include: passive PLC couplers (used to connect phases together), and non-PLC devices such as battery chargers, personal computers, laser printers and power surge suppressors. When the losses are calculated and the other factors mentioned are added in then it is easy to understand why the PLC signals may be too weak to activate a receiver. Some suppliers of PLC devices require a minimum of 50–100 mV signal strength for reliable data capture operation. Preferably, a minimum of 500 mV of signal strength should be available at any signal receiving node on the network.

Many vendors recommend using a passive coupler to couple PLC signals between phases. These couplers will further reduce the signal strength. Sometimes an amplifier repeater will be used to jump phases and amplify the signal strength. These do not solve the problem of other circuits that are on the same phase that might need to be amplified.

In a network system the PLC signal must cross phases if some PLC devices are on one phase and some PLC devices are on the other. If a passive filter (non-amplifying device) is used, a loss of about 20% of the signal strength can be expected on the other phase. These signal bridges are normally hardwired at the distribution panel. Since the distribution panel will normally be several feet from the PLC devices the wiring loses will further reduce the PLC signal strength. These loses usually cause a critical reduction of signal strength on the other phases to allow reliable communication across the PLC network.

According to conventional practice, professional installers diagnose network conflicts and determine the location of noise sources after installation. This is accomplished by the process of elimination by turning OFF circuit breakers or suspect noisy devices until the PLC devices work properly. A signal/noise analyzer may also be used to find these sources. After the noise sources have been located, they may be moved to another circuit or plug-in noise filters are used on the suspect units to prevent interference. After days, weeks or even months later another noisy device may show up and the entire PLC network must be analyzed again.

BRIEF SUMMARY OF THE INVENTION

The present invention provides a repeater amplifier for boosting weak control signals on a PLC network, with noise discrimination and signal firewall protection. The invention generally improves the reliability of power line carrier communications in an end user alternating current power distribution network, for example, in a home or business power distribution network having one or more power distribution lines that service multiple, diverse loads.

Although conventional diagnostic and noise reduction methods can be very effective, they are tedious, require special equipment and know-how, and sometimes must be repeated when the network parameters change as a result of component aging, reconfiguration and/or replacement. The approach of the present invention is to block external noise sources when the PLC network is first installed. This is accomplished by using an in-line high frequency blocking filter and a repeater amplifier circuit for each communication channel. This essentially allows the PLC network to dominate the PLC circuits by blocking all external noise sources and unwanted foreign PLC signals from the PLC network.

Each communication channel is isolated from external noise and spurious signal sources by an in-line high frequency blocking filter in combination with a repeater/amplifier/signal discrimination unit that boosts the signal strength, for example to 7.0 V peak-to-peak, not only when the network signals cross phases but also between each branch circuit on the network. At least 500 mV or higher signal strength is recommended even though signal routing (firewall protection) requires only 35 mV or less signal strength for reliable operation. The higher level is recommended to accommodate any other equipment or power surges that might weaken the signal. This coupled with the in-line high frequency blocking filter on each channel virtually eliminates any interference from spurious signal sources and electrical noise and compensates for additional loading caused by other noisy lines that load the signal strength down, for example from personal computers, laser printers, surge-protection devices, battery chargers and the like.

According to the present invention, improved communication reliability with noise discrimination and signal firewall protection is provided by repeating, at an amplified level, those receiver pulse signals that possess attributes of a valid PLC modulation signal in terms of amplitude, frequency and timing. Generally, control data signals are qualified as valid if they have a minimum signal amplitude, occur at a frequency at or very near the PLC modulation burst frequency and are coincident with the modulation burst interval. The control data signals are "amplitude-qualified" if they have an analog amplitude that exceeds a predetermined threshold value, for example an arbitrary value above an expected noise level, or the minimum value required for reliable data capture at a receiver node. The control data signals are "modulation interval-qualified" if they occur during intervals that control signal modulation is being applied to the AC supply voltage. The control data signals are "frequency-qualified" if they occur at a frequency within a predetermined frequency band centered on the transmitted power line carrier modulation frequency.

The amplitudes of recovered data signals are compared with a predetermined threshold analog value, and are qualified if the recovered value exceeds the threshold value. This test is performed by generating an analog control voltage signal that is proportional to the amplitude of the modulated AC supply voltage and comparing it with a fixed voltage level, for example the minimum value required for reliable data capture at a receiver node.

The modulation burst frequency of a recovered burst signal is detected by a phase-locked loop (PLL) receiver/decoder that outputs a transmit enable signal only during the interval that a frequency-qualified burst signal is present within the detection frequency band of the PLL decoder. Recovered burst signals that occur at a frequency outside of the detection frequency band are ignored.

Valid burst signals are transmitted during intervals that are synchronized with the positive-going and negative-going zero crossings of the modulated AC waveform. If the recovered signal occurs outside of those intervals, it is ignored.

In the preferred embodiment, the highest PLC communication reliability (with noise discrimination and signal firewall protection) is provided by repeating only those signals that are amplitude-qualified, modulation interval-qualified and frequency-qualified. All other recovered signals are ignored.

BRIEF DESCRIPTION OF THE DRAWING

The accompanying drawing is incorporated into and forms a part of the specification to illustrate the preferred embodiments of the present invention. Various advantages and features of the invention will be understood from the following detailed description taken with reference to the attached drawing figures in which.

DETAILED DESCRIPTION OF THE INVENTION

Figure 1:
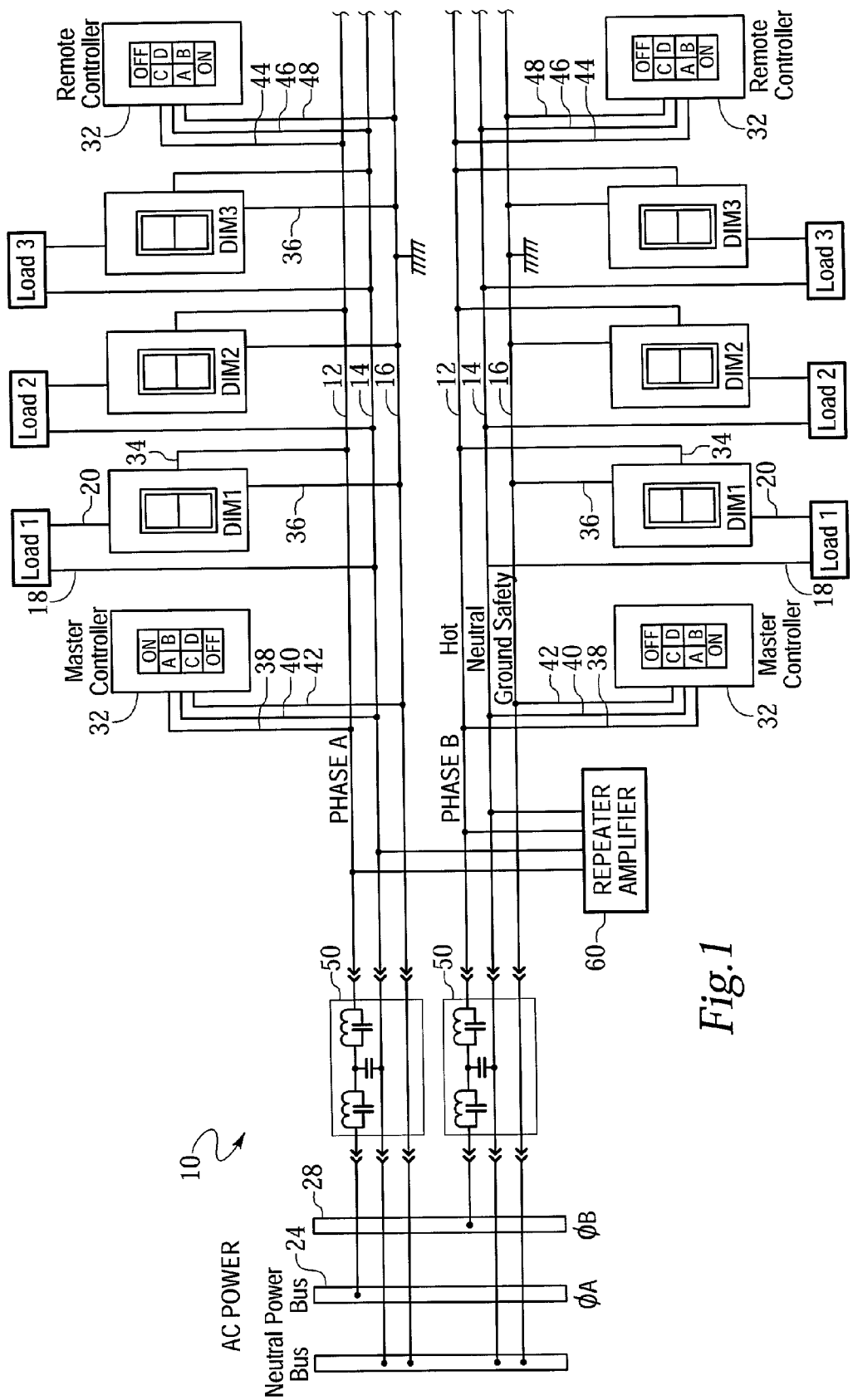
FIG. 1 is a block diagram showing a two-phase PLC network for a lighting control system in which the repeater amplifier and signal discrimination circuit of the present invention boosts weak control signals while providing noise discrimination and phase-to-phase signal firewall protection.

Preferred embodiments of the invention will now be described with reference to various examples of how the invention can best be made and used. Like reference numerals are used throughout the description and several views of the drawing to indicate like or corresponding parts.

Power lines of most electrical power distribution systems transmit electrical power of alternating current (AC) at a selected operating voltage (e.g., 110 V, 120 V or 220 V AC) and power distribution frequency (usually 60 Hz in the U.S. and 50 Hz elsewhere) via one or more phases (e.g., single-phase, two-phase or three-phase service). Referring now to FIG. 1, the repeater amplifier and signal discrimination circuit 10 of the present invention will be described with reference to a typical AC power distribution system commonly used for 110 volt, 60 Hz AC power service including hot, neutral and ground safety power line conductors 12, 14 and 16, respectively, for distributing 120 V, 60 Hz AC operating power from a public utility company to multiple loads LOAD 1, LOAD 2, ..., LOAD N that may be located, for example, in a home or business.

The power line conductors are insulted aluminum or copper wire conductors, typically 12 AWG Romex copper. Line 12, commonly known as the "hot" line, may be a black color-coded wire and line 14, referred to as the "neutral" line, may be a white color-coded wire. The neutral line is connected to earth ground by the ground safety conductor 16. Power is then distributed to the home or business over lines 12 and 14 with the neutral line 16 providing a ground at each load. Generally, a main circuit breaker is used in addition to branch circuit breakers in each power distribution branch. In some cases a separate ground wire is not used to provide a ground connection. Instead, a ground return path is obtained from a metallic conduit, water pipe or the like.

According to conventional AC wiring practice, one terminal of a lighting load, for example LOAD 1, is connected to the neutral supply conductor 14 by a load conductor 18, and the other terminal of LOAD 1 is connected to the switched terminal of a signaling device, for example a dimmer switch DIM 1 by a load conductor 20. Preferably, the dimmer switch DIM 1 is a programmable dimmer that includes a pulse receiver for decoding encoded digital data control signals conducted over the power distribution conductors. As used herein, a "signaling device" means load control devices that include a signal receiver for decoding or recovering control data signals from a modulated carrier signal, signal transmitters, and signal receiver/transmitter (R/T) units that have the ability to receive and decode, demodulate or otherwise recover digital data control signals from a modulated carrier signal, and to encode and transmit digital control signals.

Operating power is conducted through a thermal circuit breaker (FIG. 4) that connects the hot conductor 12 to the phase A power bus 24. Load current is returned through the neutral conductor 14 to a neutral bus 26. According to conventional practice, the ground safety conductor 16 is also electrically connected to the AC neutral bus and is extended in parallel with the hot conductor 12 along the distribution path for safety purposes. Phase B of the AC operating voltage is supplied to a second group of lighting loads LOAD 4, LOAD 5 and LOAD 6 on an independent power distribution circuit in which the hot conductor 12 is connected to the phase B power distribution bus 28.

The lighting control system includes a programmable master controller 30 and two or more programmable remote controllers 32, each containing a digital PLC signal receiver and transmitter.

The dimmer switches DIM 1, DIM 2, . . . , DIM N have identical circuit construction. The dimmer switch DIM 1 has a first power input conductor 34 connected to the hot power conductor 12 and a second power input conductor 36 connected to the ground safety conductor 16. The master controller 30 includes input power conductors 38, 40 and 42 electrically connected to the hot, neutral and ground conductors 12, 14, 16, respectively. Likewise, each remote controller 32 includes input power conductors 44, 46 and 48 electrically connected to the hot, neutral and ground safety conductors 12, 14, 16, respectively.

It will be appreciated that the dimmer switch stations DIM 1, DIM 2, DIM 3, . . . , DIM N are widely separated with respect to each other, and with respect to the master controller and each remote controller. Thus substantial signal attenuation and some noise generated internally by network devices can be expected along the power distribution conductors.

The dimmers, master controller and remote controllers are wire-for-wire interchangeable with conventional two-way manual power switches. Each dimmer switch, the master controller and remote controller include manually operable, momentary contact switches designated ON and OFF, respectively. According to this arrangement, independent ON/OFF manual switch operation is provided at each controller and dimmer station.

The master controller 30 and the remote controller 32 are functionally similar. Each controller is capable of storing five scenes, corresponding with four separate pre-set intensity levels (ON, A, B, C, D), and are connected in communication with each dimmer unit via the power distribution conductors 12, 14. Each controller includes a microprocessor, a read-only memory, a power supply and a serial register. These components are interconnected in the form of an information storage and retrieval system making possible the ability to store a predetermined number of scenes and to perform all the necessary control functions for receiving, transmitting and processing PLC control signals.

The master controller 30 includes an ON switch, an OFF switch and four pre-set scene switches labeled ON, A, B, C and D. All of these switches are single pole, single throw, non-latching push-button switches. The depression of each of the switches connects a grounds reference voltage available from a local power supply and provides the master controller with a logical "zero" input. The master controller recognizes logical zero as a signal that the switch has been depressed. Other configurations of the switches are possible, being important only that the switch have an operative and a non-operative position in order to provide logic signals. The ON switch provides a fade "up" function when it is depressed and held. Likewise, the OFF switch provides a fade "down" switch which is operative when, it is depressed and held in the closed position. The switches ON, A, B, C and D correspond with five predetermined control codes which are stored in the read-only memory.

The operating program of the master controller 30 addresses the various input switches and determines the status of each switch. When a preset switch is depressed, its status is logic low, and the operating program of an internal microprocessor issues a command that retrieves the corresponding address and function codes from the read-only memory and inputs the coded signals to a serial register. The contents of the register are transmitted as PLC encoded signals on the power conductors 12, 14. In the control signal output mode, a communications interface transfers the PLC encoded signals over an internal bus to the serial register according to an external clock signal. Condition codes determine the transmitting rate, and the number of start, stop and parity bits required. The complete PLC control data word is shifted out of the serial register at a predetermined clock rate.

The master controller, each remote controller and each dimming unit includes a receiver for decoding the PLC signal and comparing it with a predetermined coded number in a read-only memory. The encoded signal is input from the power conductor through an input conductor to a shift register.

Accordingly, it will be seen that each dimmer unit can be loaded with unique encoded numbers that correspond to the encoded numbers stored in the read-only memory of a remote controller or the master controller in order to obtain a particular dimming level on the dimmer output. When an input switch (ON, A, B, C, D, OFF) is depressed, PLC encoded signals are conducted over the power conductor as a serial stream of digital pulses that are applied to the shift register input of each dimmer unit. In this manner, each dimmer unit is enabled by the operator depressing one of the selector switches.

The master controller 30 will select any scene, fade to "full ON" "OFF" and raise/lower all dimmers together, without losing the scene or preset memories. Each remote controller 32 will select only the ON scene, OFF and raise/lower all channels together. For selection of a specific scene, the desired switch ON, A, B, C, D is depressed in the master controller. The current scene switch includes a light emitting diode (LED) which will glow to indicate scene status. To raise all dimmer channels together, the ON scene switch is pressed and held until the lights reach the desired intensity. When all channels are raised or lowered together, the system is in the ON condition, although each dimmer is not necessarily at its preset ON level and may, in fact, be at a lower intensity.

Various conventional signaling protocols can be used for efficiently and accurately transmitting the PLC control signals over the power conductors. The invention will be described in connection with the X-10 signal protocol that translates bursts of high-frequency signals at 120 kHz into a series of binary information pulses that correspond with a start code, address code and command code.

At a modulation frequency, preferably 120 kHz, that is much greater than the 60 Hz AC power distribution frequency, the transmission of PLC data is synchronized to the positive and negative-going zero-crossing points of the AC supply voltage waveform. Each transmission includes a start code (always set at 1110), an appliance or house code, and an operation or key code. The house code is composed of four bits representing the letters A through P. The key code is composed of five bits and either corresponds to either a number from one (1) to sixteen (16) or a particular operational command, such as ON, OFF, BRIGHT and DIM. The X-10 protocol supports up to 256 address codes as there are sixteen (16) letters and sixteen (16) numbers available as an address designation for an addressable device connected to the system. These 256 addresses are represented by A1–A16, B1–B16, . . . , P1–P16.

To ensure data integrity, both the house codes and key codes of the X-10 protocol are actually transmitted in true and complement form on alternate half cycles of the power line. For example, if the letter B is represented by the house code 1110, the pattern 10101001 is actually transmitted as the house code. Thus, transmission of the four (4) bit start code, the four (4) bit house code, and the five (5) bit key code takes a total twenty-two (22) cycles.

The data signals are transmitted in a series of paired command transmissions using the X-10 protocol generally in serial form:

[address][address] . . . [function][function]

where ". . . " represents a pause or delay between each pair of command transmissions of at least three power line cycles in duration, "address" represents an address of a particular receiver and "function" represents the operation to be performed at the transmitted address. The address and function commands are each composed of a start code, a house code and a key code as described above and are repeated to ensure proper data integrity in the transmission. Moreover, several sets of address commands may be transmitted in succession such that the function command transmitted is applied to the preceding addresses transmitted. Thus, for example, to instruct receivers identified as A1 and A2 to be turned off, the following data pattern commands are transmitted:

[A1][A1] . . . [A2][A2] . . . [Aoff][Aoff]

Upon receipt of this command by the receivers connected to devices A1 and A2, power to the devices is disconnected by the receiver. Commands other than [Aoff], such as [Aon] or [Dim] (to dim lights) may also be used.

Figure 2:
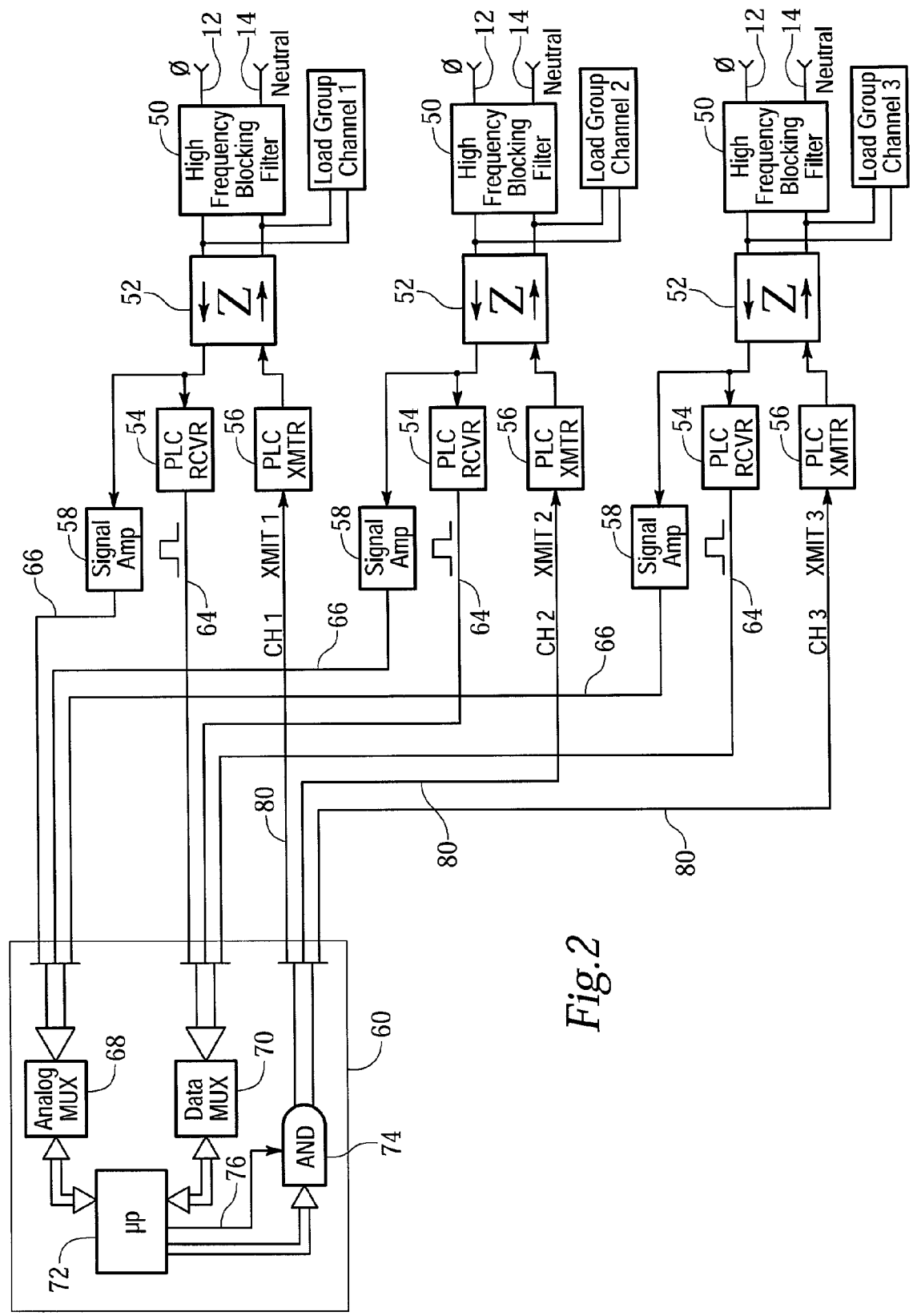
FIG. 2 is a block diagram of a multiple channel PLC network for a lighting control system in which the repeater amplifier and signal discrimination circuit of the present invention boosts weak control signals while providing noise discrimination and channel-to-channel signal firewall protection.
Figure 3A:
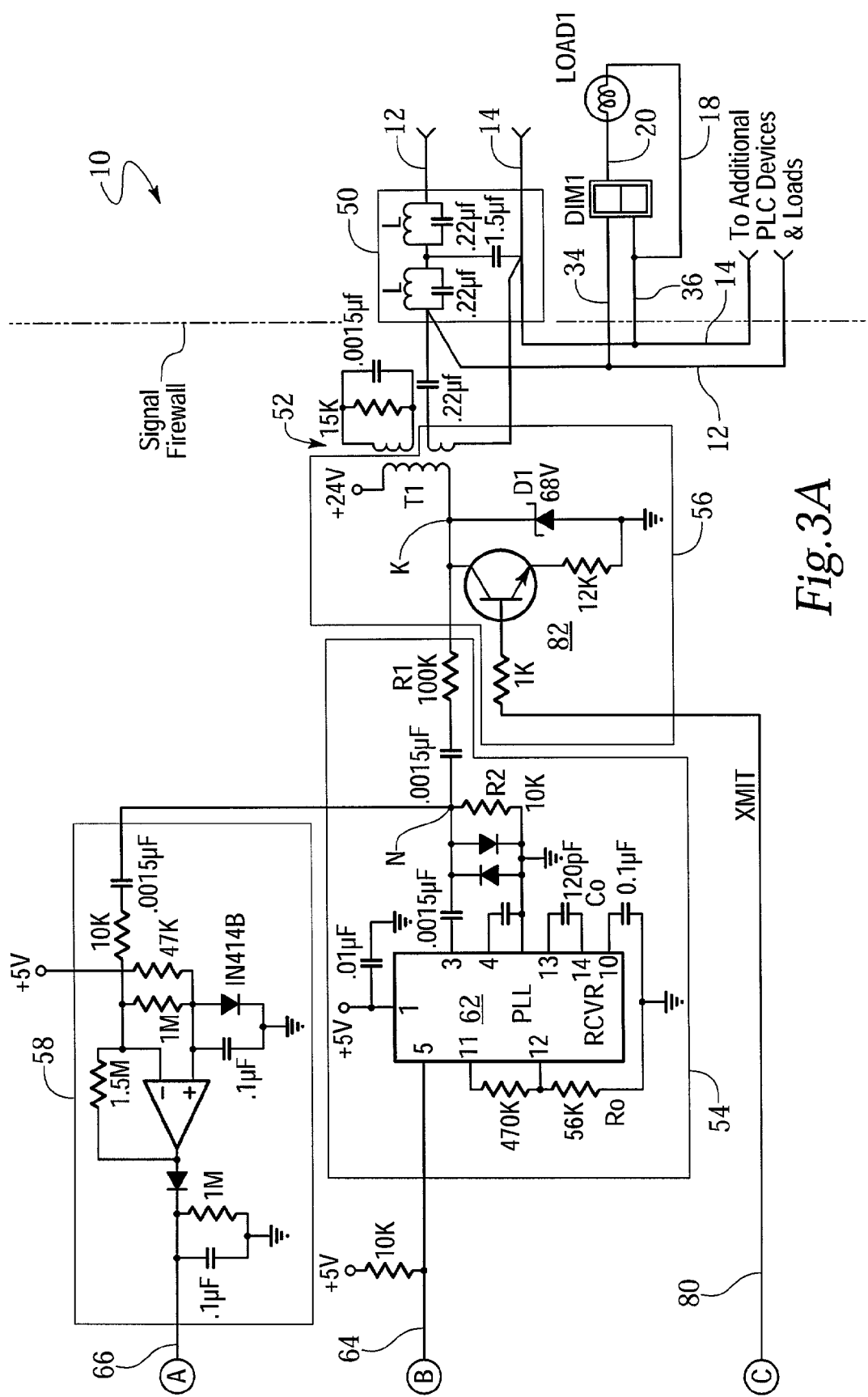
FIG. 3A is a simplified schematic diagram showing circuit details for the high frequency blocking filter and repeater amplifier circuit of the present invention connected to a single PLC load channel.
Figure 4:
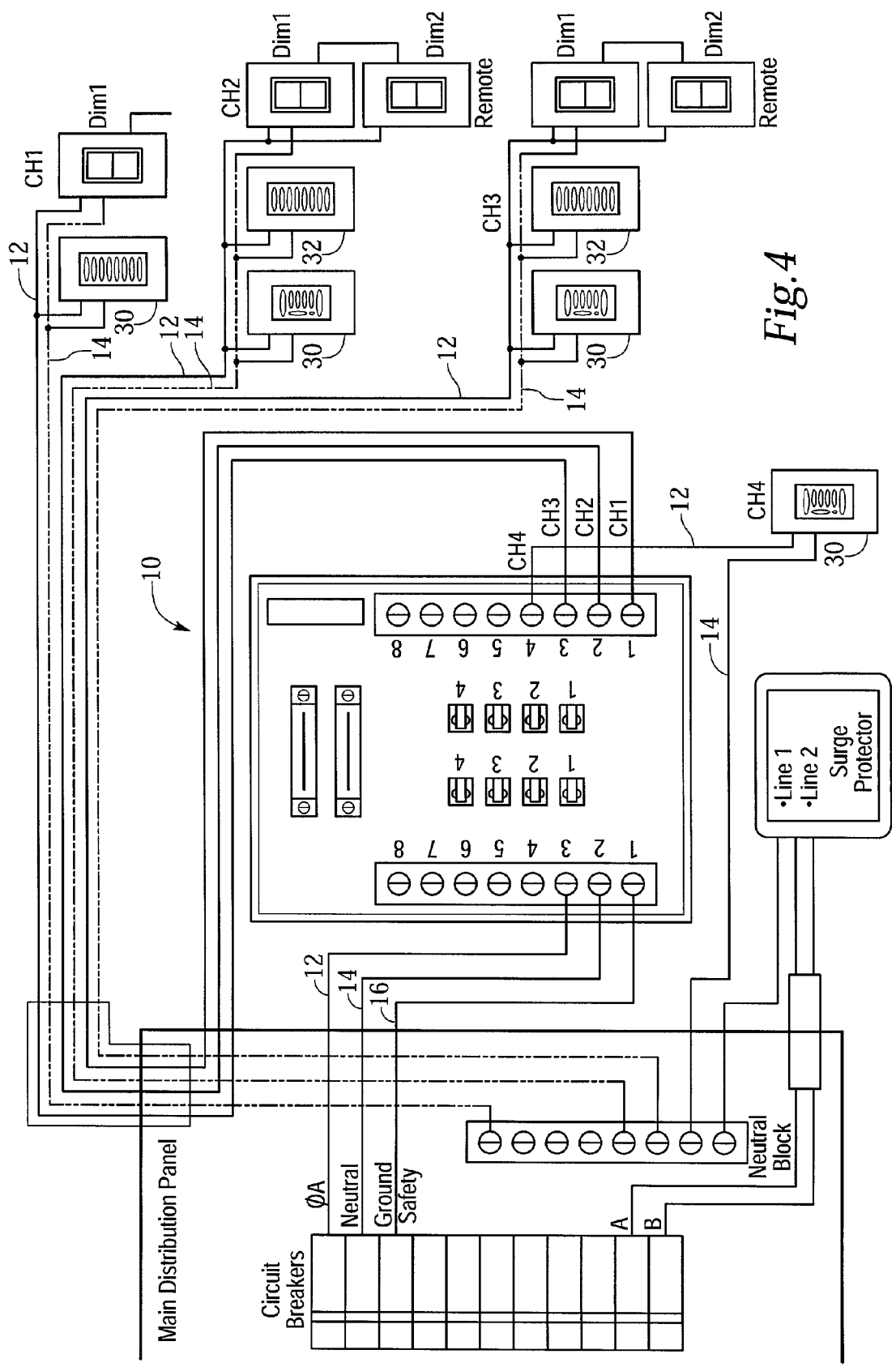
FIG. 4 is a simplified block diagram of the repeater amplifier and signal discrimination circuit of FIG. 2 showing wiring interconnections for multiple PLC load channels.

Referring now to FIG. 2, FIG. 3A and FIG. 4, a high frequency blocking filter 50 has input terminals connected to an AC power source and output terminals connected in series with the power distribution conductors 12, 14. The blocking filter 50 provides a high-frequency attenuation ratio of 40:1, thus isolating the PLC network and its connected components from external noise and spurious high frequency signals. Preferably, the high frequency blocking filter 50 is realized by a symmetrical, T-section low pass filter circuit that has very low attenuation from DC up through the power distribution frequency (50 Hz–60 Hz) to a cutoff frequency (e.g., 80 kHz), and "blocks" or substantially attenuates all other signals above the cutoff frequency.

Each section of the symmetrical low pass filter circuit 50 preferably includes an inductor L and a capacitor C connected in a parallel resonant circuit that is tuned to present maximum impedance to signals at power line carrier modulation frequencies in the kilohertz region (e.g., 80–160 kHz), but present minimum impedance to signals at AC power distribution frequencies in the 50 Hz/60 Hz range with very little attenuation or loss. For operation at 60 Hz AC power distribution and 120 kHz PLC carrier modulation, the preferred capacitor value C is 0.22 uF and the preferred inductance value L is 9.4 uH for each section. This allows the 60 Hz AC supply power to pass with very low attenuation, thus delivering clean, filtered AC current and voltage at 60 Hz on the power distribution conductors 12,14 that supply operating power to the dimmers, master controller and remote controllers.

According to an important feature of the present invention, the clean, filtered AC current and voltage is also supplied as operating power to the repeater amplifier and signal discrimination circuit 60. The circuit 60 includes a bidirectional signal transmission circuit 52, a PLC receiver 54, a PLC transmitter 56, a PLC signal amplifier 58 and a microprocessor controller 60. All components connected to the filtered side of the power distribution conductors are isolated from external noise and spurious signals from external devices on other phases or other channels.

The repeater amplifier/signal discrimination circuit 60 is coupled to the power distribution conductors on the clean, filtered output side of the high frequency blocking filter 50. The repeater amplifier/signal discrimination circuit 60 and the blocking filter 50 can be enclosed within a common housing, as shown in FIG. 4, or can be physically located in separate housings as shown in FIG. 1.

When a PLC control data signal is transmitted by the master controller 30 or one of the remote controllers 32, a high-frequency burst of PLC control pulses at 120 kHz is transmitted in sync with zero crossover ZX of the filtered AC power waveform over the power distribution conductors and are received by all devices that are coupled to that particular power distribution channel. The filtered AC supply waveform along with the PLC data signal burst is input to the two-port bidirectional signal transmission circuit 52 (FIG. 2). Bidirectional signal transmission between the filter circuit 50 and the signal discrimination circuit 60 is provided by a high frequency coupling impedance Z. preferably including a transformer T1 (FIG. 3A) that has a primary winding for receiving filtered AC supply voltage from the filter 50 and a secondary winding.

The secondary winding is biased by a 24 volt DC supply voltage and a clamping circuit formed by a Zener diode D1 connected in series with the secondary winding and a reference potential. The clamping circuit provides a fixed voltage drop at a first clamping level across the signal port node K of the coupling impedance Z in the absence of a modulation signal on the AC supply voltage waveform, and a second clamping level in response to a logic high value of the modulation signal. The bidirectional coupling impedance Z may also be provided by a coupling capacitor.

The filtered AC power waveform, modulated periodically (at each zero cross ZX) by a 120 kHz binary data burst signal, is input to the PLC receiver 54 through a voltage divider formed by resistors R1, R2 at an input node N to a PLC receiver circuit 62 formed by a phase locked loop detector (PLL). The 120 kHz binary data burst signal is also input to the PLC signal amplifier 58. The PLL detector 62 outputs a logic one command signal BURST on a data output signal line 64 for the duration of the PLC burst signal, approximately one millisecond. At the same time, the PLC burst signal is amplified by the PLC signal amplifier 58 yielding a amplified PLC voltage output signal VOUT on an analog data signal output line 66 having an amplitude in the range of 0.6–4.0 volts DC.

Figure 3B:
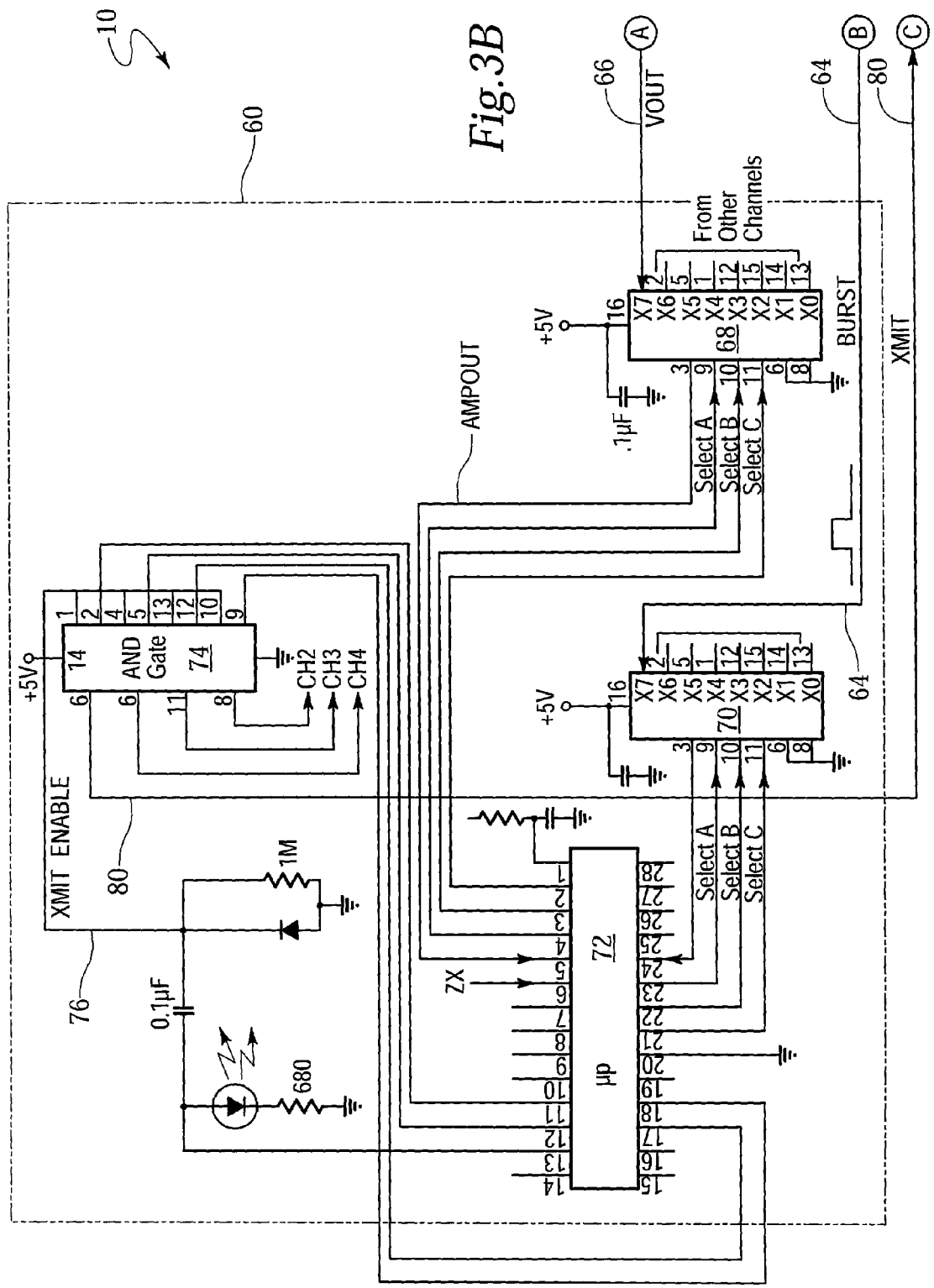
FIG. 3B is a continuation of FIG. 3A, showing circuit details for the signal discrimination circuit of the present invention.

Referring now to FIG. 3B, the amplified PLC analog output signal VOUT is input to the signal discrimination circuit 60 on one input of an analog data multiplexer(MUX) 68, and the PLC command signal BURST output from the PLL signal decoder 62 is applied by signal conductor 64 to a data signal input of a digital data multiplexer (MUX) 70. The amplitude data output signal AMPOUT of the analog signal multiplexer 68 is selected by a binary code placed on the select lines Select A, Select B and Select C according to program instructions stored in a memory section of a microprocessor 72 (FIG. 3B).

The analog data signals AMPOUT are input through pin 5 of the microprocessor 72 and are converted to serial digital data signals CH1DATA, CH2DATA, CH3DATA, CH4DATA that are stored in four serial registers. The contents of the serial registers are output to the logical input terminals (2,5,9 and 12) of a four-section AND gate 74. The other input terminals (1,4,10 and 13) of each AND gate section are connected together for receiving as a common input the transmit enable signal XMIT ENABLE that is either logic low or logic high, and is output from the microprocessor on control line 76 to the common input of the quad-section AND gate 74. The transmit enable signal is logic high only during the interval that a 120 kHz PLC modulation burst signal is being detected by the PLL signal decoder 62.

The microprocessor 72 compares the amplitude of the analog PLC signals AMPOUT input on pin 5, and generates the transmit enable signal only when the amplitude exceeds a predetermined analog voltage threshold level, for example, +0.6 volts DC. The signal AMPOUT is rejected as being an amplitude-qualified PLC data signal if the comparison test fails. Additionally, even if the signal magnitude is sufficient to pass the amplitude comparison test, the transmit enable signal will not transition to logic high (true) if AMPOUT occurs outside of the PLC signal burst interval, i.e. is not time coincident with BURST, and thus is not PLC modulation-interval qualified. Likewise, the transmit enable signal will not transition to logic high (true) and no transmit enable signal will be generated if the received pulse signals are not PLC frequency-qualified, since the PLL decoder 62 is not responsive to signals occurring at a frequency outside of its pass band, even though such signals may otherwise be amplitude-qualified and/or modulation-interval qualified. This effectively screens out interference from spurious signal sources, cross-talk signals and random noise.

The microprocessor 72 evaluates the recovered signals during each modulation burst interval and repeats the qualified recovered signals after a delay of one command cycle. If the recovered data signals are PLC amplitude-qualified (amplitude exceeds a predetermined threshold value) and occur at the PLC modulation frequency during a PLC modulation signal burst interval that is synchronized with the zero cross signal ZX, the PLC-qualified data signals AMPOUT are gated serially as binary transmit data signals XMIT from the output of the AND gate 74 on a control signal conductor 80 to the gate of a gate-controlled switch 82 (NPN transistor Q) that is connected in parallel across the Zener diode D1.

When the data signal XMIT is at logic zero, the gate-controlled switch 82 is turned OFF, and the Zener diode D1 clamps the secondary winding of the coupling transformer 52 at 68 volts DC. However, when the data signal XMIT rises to logic 1 value, the base emitter junction of the NPN transistor Q becomes forward-biased, thus turning it ON, and the current output through the AND gate 74 drives it to the ON state in deep saturation, thus pulling the secondary winding of the transformer 52 toward reference potential. This produces a 7.0 volt peak-to-peak binary output signal across the primary winding, thus faithfully repeating the 120 kHz PLC burst signal (after a delay of one command cycle) at an amplified voltage level across the power distributions conductors. This effectively boosts the strength of the PLC control signals that appear at the receiver nodes of the master controllers 30, remote controllers 32 and dimmers of the channel load group.

PLC control signal (burst frequency) detection is provided by the phase-locked loop (PLL) decoder 62, preferably Model XR-2211 manufactured by EXAR Corporation. The decoder circuit 62 outputs a transmit enable signal only during the interval that a modulation burst signal is present within the detection frequency band of the PLL decoder. All other receiver signals are ignored.

The decoder circuit 62 is a monolithic phase-locked loop (PLL) decoder designed for data communications applications. It operates over a wide supply voltage range of 4.5 to 20V and a wide frequency range of 0.01 Hz to 300 kHz. It can accommodate analog signals between 10 mV and 3.0 V, and can interface with conventional DTL, TTL, and ECL logic families. The decoder circuit consists of a simple phase-locked loop (PLL) for tracking an input signal within its pass band, a quadrature phase detector that provides carrier detection, and an FSK voltage comparator that provides FSK demodulation. External components are used to independently set center frequency, bandwidth and output delay. An internal voltage reference proportional to the power supply is provided at an output pin.

The logic output, LDOQ at pin 5 of the decoder 62 is normally at the "low" logic state. When a 120 kHz signal is present within the detection band of the PLL, the logic state at the outputs become high for the duration of the input signal. The logic output LDOQ can sink 5 mA of load current, and is an open collector type stage, requiring external pull-up resistors and as shown in FIG. 3A.

Referring again to FIG. 3A, the functions of the external circuit components are explained as follows: $R_0$ and $C_0$ set VCO center frequency; the 470K resistor connected across pins 11, 12 sets the detection bandwidth; and capacitor $C_1$ sets the low pass-loop filter time constant and the loop damping factor.

The PLC signal amplifier 58 is an AC coupled, non-inverting high gain amplifier, preferably Model LM324, manufactured by national Semiconductor Corporation.

Each multiplexer 68, 70 is a digitally controlled analog switch implemented in silicon-gate CMOS technology, preferably Model MM74HC4051 manufactured by Fairchild Semiconductor Corporation. The analog switch has low "ON" resistance and low "OFF" leakages. It is a bidirectional switch, thus any analog input may be used as an output and vice-versa. The multiplexer allows control of up to ±6V (peak) analog signals with digital control signals of 0 to 6V. Three supply pins are provided for Vcc, ground and VEE. This enables the connection of 0–5V logic signals when $V_{cc}=5V$ and an analog input range of ±5V when $V_{EE}=5V$. All three devices also have an inhibit control which when at logic HIGH will disable all switches to their OFF state. All analog inputs and outputs and digital inputs are protected from electrostatic damage by diodes to $V_{cc}$ and ground.

Each multiplexer 68,70 connects together the outputs of 8 switches, thus achieving an eight channel multiplexer for servicing up to as many as eight power distribution channels. The binary code placed on the A, B and C select lines determines which one of the eight switches is "ON", and connects one of the eight inputs to the common output (pin 3).

The microprocessor 72 may be any one of several conventional microprocessors that are commercially available, preferably Model PIC16C66 manufactured by Microchip Technology Inc. The type of microprocessor preferred is largely dependent upon the capacity desired, and is capable of processing a variety of logical and arithmetic operations on or between two accumulation registers including additions, subtractions, logical AND'S, OR'S, compares, complements, tests and shifts. Dedicated registers are used in the control of the system, and include a program counter, an index register, a stack pointer and a condition code register. These are generally controlled by the microprocessor logic, although they may be used or altered under program control.

The microprocessor 72 has a read-only memory that includes an operating program. The operating program allows user programs and data to be stored in the read-only memory, the working registers to be examined and the execution of the user program to be supervised. Preferably, the read-only memory is an electrically programmable read-only memory (EPROM).

The arrangement of FIG. 3A and FIG. 3B illustrates only a single channel. However, up to eight channels can be serviced, since the analog multiplexers and the microprocessor have a capacity for eight channels. A four channel system is shown in FIG. 4.

The AND gate 74 is a high speed CMOS 2-input quad AND gate, preferably Model M54HC08 manufactured by SGS-Thomson Microelectronics, Inc.

In summary, noise discrimination and signal firewall protection are provided according to the preferred embodiment of the present invention by filtering the AC supply voltage that is applied to the power distribution conductor and blocking or substantially attenuating the passage of noise and other signals from external sources that occur at a frequency higher than the power distribution frequency, and selectively repeating only those signals that are PLC qualified with respect to amplitude, modulation interval and/or frequency.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

What is claimed is:

1. Control apparatus for improving the reliability of two-way communication between two or more signaling devices in a power line carrier communication network of the type including a power distribution conductor for distributing AC supply voltage to one or more loads, a transmitter coupled to the power distribution conductor for modulating the AC supply voltage with control data signals at a power line carrier modulation frequency, and a receiver coupled to the power distribution conductor for recovering the control data signals and using the control data signals to apply AC power to one or more of the loads, the control apparatus comprising, in combination:

a blocking filter including an input terminal for receiving AC supply voltage from an AC power source and an output terminal for delivering filtered AC supply voltage to a power distribution conductor while substantially attenuating the passage of high frequency signals between the input and output terminals of the blocking filter, the blocking filter including a filter circuit that provides low signal attenuation from DC through the power distribution frequency of the AC supply voltage up to a cutoff frequency, and provides high signal attenuation above the cutoff frequency; and a signal repeater circuit connectable to the power distribution conductor on the output of the blocking filter for recovering control data signals from modulated AC supply voltage and repeating the control data signals at an amplified voltage level on the power distribution conductor.

2. Control apparatus for improving the reliability of two-way communication between two or more signaling devices in a power line carrier communication network as set forth in claim 1, further comprising:

a signal discrimination circuit coupled to the signal repeater circuit for selectively enabling operation of the signal repeater circuit in response to the recovery of control data signals that have an amplitude exceeding a predetermined threshold value.

3. Control apparatus for improving the reliability of two-way communication between two or more signaling devices in a power line carrier communication network as set forth in claim 1, further comprising:

a signal discrimination circuit coupled to the signal repeater circuit for selectively enabling operation of the signal repeater circuit in response to the recovery of control data signals occurring at a frequency within a predetermined frequency band centered on the transmitted power line carrier modulation frequency.

4. Control apparatus for improving the reliability of two-way communication between two or more signaling devices in a power line carrier communication network as set forth in claim 1, further comprising:

a signal discrimination circuit coupled to the signal repeater circuit for selectively enabling operation of the signal repeater circuit in response to the recovery of control data signals occurring during intervals that power line carrier modulation is being applied to the AC supply voltage.

5. Control apparatus for improving the reliability of two-way communication between two or more signaling devices in a power line carrier communication network as set forth in claim 1, wherein the signal repeater circuit comprises:

a receiver coupled to the power distribution conductor for recovering control data signals from the modulated AC supply voltage;

an amplifier coupled to the power distribution conductor for generating an analog control signal that is proportional to the amplitude of the modulated AC supply voltage;

a transmitter for amplifying control data signals and modulating the AC supply voltage with the amplified control data signals; and a signal discrimination circuit coupled to the receiver and to the signal amplifier for inputting recovered control data signals to the transmitter and selectively enabling the transmitter to repeat the recovered control data signals at an amplified voltage level in response to the recovery of control data signals that satisfy one or more of the following conditions: (a) have an analog amplitude exceeding a predetermined threshold value, or (b) occur during intervals that power line carrier modulation is being applied to the AC supply voltage, or (c) occur at a frequency within a predetermined frequency band centered on the transmitted power line carrier modulation frequency.

6. Control apparatus for improving the reliability of two-way communication between two or more signaling devices in a power line carrier communication network of the type including a power distribution conductor for distributing AC supply voltage to one or more loads, a transmitter for periodically modulating the AC supply voltage with a burst of control data signals at a power line carrier modulation frequency, and a receiver coupled to the power distribution conductor for recovering the control data signals and using the control data signals to apply AC power to one or more of the loads, the control apparatus comprising, in combination:

a high frequency blocking filter including a power input terminal for receiving AC supply voltage from an AC power source and a power output terminal for delivering filtered AC supply voltage to a power distribution conductor while blocking or substantially attenuating the passage of high frequency signals between the input and output terminals of the blocking filter;

a repeater connectable to the power distribution conductor on the output side of the high frequency blocking filter for recovering control data signals from modulated AC supply voltage and repeating the control data signals at an amplified voltage level on the power distribution conductor; and a signal discrimination circuit coupled to the repeater for selectively enabling the repeater to transmit the amplified control data signals in response to the recovery of control data signals that satisfy each of the following conditions: (a) have an analog amplitude that exceeds a predetermined analog threshold value, and (b) occur during intervals that power line carrier modulation is being applied to the AC supply voltage, and (c) occur at a frequency within a predetermined frequency band centered on the transmitted power line carrier modulation frequency.

7. Control apparatus for improving the reliability of two-way communication between two or more signaling devices in a power line carrier communication network of the type including a power distribution conductor for distributing AC supply voltage to one or more loads, a transmitter for periodically modulating the AC supply voltage with a burst of control data signals at a power line carrier frequency, and a receiver coupled to the power distribution conductor for recovering the control data signals and using the control data signals to apply AC power to one or more of the loads, the control apparatus comprising, in combination:

a high frequency blocking filter including a power input terminal for receiving AC supply voltage from an AC power source and a power output terminal for delivering filtered AC supply voltage to a power distribution conductor while blocking or substantially attenuating the passage of high frequency signals between the input and output terminals of the blocking filter;

a repeater connectable to the power distribution conductor on the output side of the high frequency blocking filter for recovering control data signals from modulated AC supply voltage and transmitting amplified control data signals on the power distribution conductor substantially in synchronous relation with the recovered control data signals; and a signal discrimination circuit coupled to the repeater for enabling the repeater to transmit amplified control data signals in response to the recovery of control data signals that satisfy one or more the following conditions: (a) have an analog amplitude that exceeds a predetermined analog threshold value, or (b) occur during intervals that power line carrier modulation is being applied to the AC supply voltage, or (c) occur at a frequency within a predetermined frequency band centered on the transmitted power line carrier modulation frequency.

8. Control apparatus for improving the reliability of two-way communication between two or more signaling devices in a power line carrier communication network of the type including a power distribution conductor for distributing AC supply voltage to one or more loads, a transmitter for periodically modulating the AC supply voltage with a burst of control data signals at a power line carrier frequency, and a receiver coupled to the power distribution conductor for recovering the control data signals and using the recovered control data signals to apply AC power to one or more of the loads, the control apparatus comprising, in combination:

a high frequency blocking filter including a power input terminal for receiving AC supply voltage from an AC power source and a power output terminal for delivering filtered AC supply voltage to a power distribution conductor while blocking or substantially attenuating the passage of high frequency signals between the input terminal and output terminal of the blocking filter;

a repeater connectable to the power distribution conductor on the output side of the high frequency blocking filter for recovering control data signals from modulated AC supply voltage and transmitting the control data signals at an amplified voltage level on the power distribution conductor; and a signal discrimination circuit coupled to the repeater for selectively enabling operation of the repeater in response to the recovery of control data signals that (a) have an analog amplitude that exceeds a predetermined analog threshold value, and (b) occur at a frequency lying in a predetermined frequency band centered on the transmitted power line carrier communication frequency.

9. Control apparatus for improving the reliability of two-way communication between two or more signaling devices in a power line carrier communication network of the type including a power distribution conductor for distributing AC supply voltage to one or more loads, a transmitter for periodically modulating the AC supply voltage with a burst of control data signals at a power line carrier frequency, and a receiver coupled to the power distribution conductor for recovering the control data signals and using the control data signals to apply AC power to one or more of the loads, the control apparatus comprising, in combination:

a high frequency blocking filter including a power input terminal for receiving AC supply voltage from an AC power source and a power output terminal for delivering filtered AC supply voltage to a power distribution conductor while blocking or substantially attenuating the passage of high frequency signals between the input and output terminals of the blocking filter;

a signal repeater connectable to the power distribution conductor on the output side of the high frequency blocking filter for recovering control data signals from modulated AC supply voltage and transmitting the control data signals at an amplified voltage level on the power distribution conductor; and a signal discrimination circuit coupled to the repeater for selectively enabling operation of the repeater in response to the recovery of control data signals that (a) occur during intervals that power line carrier modulation is being applied to the AC supply voltage, and (b) occur at a frequency within a predetermined frequency band centered on the applied power line carrier modulation frequency.

10. Control apparatus for improving the reliability of two-way communication between two or more signaling devices in a power line carrier communication network of the type including a power distribution conductor for distributing AC supply voltage to one or more loads, a transmitter for periodically modulating the AC supply voltage with a burst of control data signals at a power line carrier modulation frequency, and a receiver coupled to the power distribution conductor for recovering the control data signals and using the control data signals to apply AC power to one or more of the loads, the control apparatus comprising, in combination:

a high frequency blocking filter including a power input terminal for receiving AC supply voltage from an AC power source and a power output terminal for delivering filtered AC supply voltage to a power distribution conductor while blocking or substantially attenuating the passage of high frequency signals between the input and output terminals of the blocking filter;

a signal repeater connectable to the power distribution conductor on the output side of the high frequency blocking filter for recovering control data signals from modulated AC supply voltage and transmitting the control data signals at an amplified voltage level on the power distribution conductor; and a signal discrimination circuit coupled to the repeater for selectively enabling operation of the repeater in response to the recovery of control data signals that (a) have an analog amplitude that exceeds a predetermined analog threshold value, and (b) occur during intervals that power line carrier modulation is being applied to the AC supply voltage.

11. Control apparatus for improving the reliability of two-way communication between two or more signaling devices in a power line carrier communication network of the type including a power distribution conductor for distributing AC supply voltage to one or more loads, a transmitter for periodically modulating the AC supply voltage with a burst of control data signals at a power line carrier frequency, and a receiver coupled to the power distribution conductor for recovering the control data signals and using the recovered control data signals to apply AC power to one or more of the loads, the control apparatus comprising, in combination:

a bidirectional signal coupling circuit having an input for receiving AC supply voltage from an AC power source and an output for delivering AC supply voltage to a power distribution conductor;

a modulation decoder circuit coupled to the output of the bidirectional signal coupling circuit for recovering high-frequency modulation data from the AC supply voltage;

a signal amplifier coupled to the output of the signal coupling circuit for generating an analog control signal proportional to the amplitude of the AC supply voltage;

a comparison circuit coupled to the signal amplifier for producing a transmit enable signal that has a logic high value when the amplitude of the analog control signal exceeds a pre-determined threshold value and has a logic zero value when the amplitude is less than the pre-determined threshold value;

a gate-actuated switch coupled to the output of the bidirectional coupling circuit, the switch having switched and unswitched terminals for connecting and removing bias clamping voltage to and from the output of the bidirectional coupling circuit, and having a gate terminal for turning the switch ON and OFF in response to binary logic signals;

a clamping circuit coupled to the output of the bidirectional coupling circuit for clamping the coupling circuit output at a first voltage level when the gate-actuated switch is in the OFF condition, and clamping the coupling circuit output at a second voltage level when the gate-actuated switch is in the ON condition; and a signal discrimination circuit having a first input connected to the comparison circuit for receiving the transmit enable signal, a second input connected to the output of the modulation decoder for receiving the binary modulation data, and an output coupled to the gate of the gate-actuated switch, wherein the gate-actuated switch is gated ON and OFF in response to the binary modulation data.

12. Control apparatus for improving the reliability of two-way communication between two or more signaling devices in a power line carrier communication network of the type including a power distribution conductor for distributing AC supply voltage to one or more loads, a transmitter coupled to the power distribution conductor for modulating the AC supply voltage with control data signals at a power line carrier modulation frequency, and a receiver coupled to the power distribution conductor for recovering the control data signals and using the control data signals to apply AC power to one or more of the loads, the control apparatus comprising, in combination:

a high frequency blocking filter including a power input circuit for receiving AC supply voltage from an AC power source and a power output circuit for delivering filtered AC supply voltage to a power distribution conductor while blocking or substantially attenuating the passage of high frequency signals between the input and output terminals of the blocking filter;

a bidirectional signal transmission circuit having a first signal port coupled to the power distribution conductor and having a second signal port;

a signal repeater connected to the second signal port for recovering control data signals from modulated AC supply voltage and repeating the control data signals at an amplified voltage level on the power distribution conductor; and a signal discrimination circuit coupled to the signal repeater for selectively enabling operation of the repeater in response to the recovery of control data signals that satisfy one or more of the following conditions: (a) have an analog amplitude exceeding a predetermined threshold value, or (b) occur during intervals that power line carrier modulation is being applied to the AC supply voltage, or (c) occur at a frequency within a predetermined frequency band centered on the transmitted power line carrier modulation frequency.

13. A method for improving the reliability of two-way communication between two or more signaling devices in a power line carrier communication network of the type including a power distribution conductor for distributing AC supply voltage at a power distribution frequency to one or more loads, a transmitter for periodically modulating the AC supply voltage with a burst of control data signals at a power line carrier modulation frequency, and a receiver coupled to the power distribution conductor for recovering the control data signals and using the control data signals to apply AC power to one or more of the loads, comprising the steps:

filtering the AC voltage that is supplied to the power distribution conductor by blocking or substantially attenuating the passage of signals that occur at a frequency higher than the power distribution frequency;

modulating the filtered AC supply voltage with a burst of control data signals at a power line carrier modulation frequency during a first command cycle;

recovering the control data signals from the modulated AC voltage;

amplifying the recovered control data signals; and modulating the filtered AC supply voltage with the amplified control data signals during a second command cycle.

14. A method for improving the reliability of two-way communication between two or more signaling devices in a power line carrier communication network as set forth in claim 13, wherein the amplified control data modulation step is selectively performed in response to the recovery of control data signals that have an amplitude exceeding a predetermined analog threshold value.

15. A method for improving the reliability of two-way communication between two or more signaling devices in a power line carrier communication network as set forth in claim 13, wherein the amplified control data modulation step is selectively performed in response to the recovery of control data signals that occur at a frequency within a predetermined frequency band centered on the transmitted power line carrier modulation frequency.

16. A method for improving the reliability of two-way communication between two or more signaling devices in a power line carrier communication network as set forth in claim 13, wherein the amplified control data modulation step is selectively performed in response to the recovery of control data signals that occur during intervals that power line carrier modulation is being applied to the filtered AC supply voltage.

17. A method for improving the reliability of two-way communication between two or more signaling devices in a power line carrier communication network as set forth in claim 13, wherein the amplified control data modulation step is selectively performed in response to the recovery of control data signals that (a) have an analog amplitude that exceeds a predetermined analog threshold value, and (b) occur at a frequency lying in a predetermined frequency band centered on the transmitted power line carrier communication frequency.

18. A method for improving the reliability of two-way communication between two or more signaling devices in a power line carrier communication network as set forth in claim 13, wherein the amplified control data modulation step is selectively performed in response to the recovery of control data signals that (a) occur during intervals that power line carrier modulation is being applied to the AC supply voltage, and (b) occur at a frequency lying in a predetermined frequency band centered on the transmitted power line carrier communication frequency.

19. A method for improving the reliability of two-way communication between two or more signaling devices in a power line carrier communication network as set forth in claim 13, wherein the amplified control data modulation step is selectively performed in response to the recovery of control data signals that (a) have an amplitude exceeding a predetermined analog threshold value; and (b) occur during intervals that power line carrier modulation is being applied to the AC supply voltage.

20. A method for improving the reliability of two-way communication between two or more signaling devices in a power line carrier communication network as set forth in claim 13, wherein the amplified control data modulation step is selectively performed in response to the recovery of control data signals that (a) have an amplitude exceeding a predetermined analog threshold value; and (b) occur during intervals that power line carrier modulation is being applied to the AC supply voltage; and (c) occur at a frequency lying in a predetermined frequency band centered on the transmitted power line carrier communication frequency.

* * * * *